US011660958B2

(12) United States Patent
Yasuda et al.

(10) Patent No.: US 11,660,958 B2
(45) Date of Patent: May 30, 2023

(54) MULTIPURPOSE VEHICLE

(71) Applicant: Kubota Corporation, Osaka (JP)

(72) Inventors: Toshifumi Yasuda, Sakai (JP); Takashi Kuramoto, Sakai (JP); Kensuke Okabe, Sakai (JP); Hiroshi Takagi, Sakai (JP)

(73) Assignee: Kubota Corporation, Osaka (JP)

( * ) Notice: Subject to any disclaimer, the term of this patent is extended or adjusted under 35 U.S.C. 154(b) by 260 days.

(21) Appl. No.: 17/098,630

(22) Filed: Nov. 16, 2020

(65) Prior Publication Data

US 2021/0188083 A1 Jun. 24, 2021

(30) Foreign Application Priority Data

Dec. 19, 2019 (JP) .............................. JP2019-229290

(51) Int. Cl.
*B60K 17/10* (2006.01)
*B60K 5/00* (2006.01)
*B60K 17/28* (2006.01)
*F16H 47/06* (2006.01)
*F16H 57/02* (2012.01)

(52) U.S. Cl.
CPC ................ *B60K 17/10* (2013.01); *B60K 5/00* (2013.01); *B60K 17/28* (2013.01); *F16H 47/06* (2013.01); *F16H 57/02* (2013.01); *F16H 2057/02056* (2013.01); *F16H 2702/00* (2013.01)

(58) Field of Classification Search
CPC .......... B60K 17/10; B60K 5/00; B60K 17/28; F16H 47/06; F16H 57/02; F16H 2057/02056
See application file for complete search history.

(56) References Cited

U.S. PATENT DOCUMENTS

| 5,462,131 | A | * | 10/1995 | Eidam | .................... | B60K 17/28 |
| | | | | | | 180/53.3 |
| 5,611,242 | A | * | 3/1997 | Santachiara | ........... | B60K 17/28 |
| | | | | | | 74/15.63 |
| 5,690,001 | A | * | 11/1997 | Matsufuji | ............... | F16H 57/04 |
| | | | | | | 74/606 R |
| 9,840,141 | B2 | * | 12/2017 | Ooki | ..................... | F16H 57/021 |

(Continued)

FOREIGN PATENT DOCUMENTS

JP 2012051506 A 3/2012

*Primary Examiner* — Frank B Vanaman
(74) *Attorney, Agent, or Firm* — The Webb Law Firm (57) ABSTRACT

A multipurpose vehicle includes a stepless speed changer which is provided at one of lateral sides of a vehicle body with respect to an engine and a traveling transmission, an engine output shaft projected from the engine toward the stepless speed changer along a lateral direction of the vehicle body, a speed changer input shaft projected from the stepless speed changer toward the engine along the lateral direction of the vehicle body, and a first gear transmission mechanism provided between and across the engine output shaft and the speed changer input shaft and transmitting power of the engine output shaft to the speed changer input shaft. The multipurpose vehicle further has a PTO section provided at the side of the stepless speed changer with respect to the engine and forwardly of the stepless speed changer, the PTO section being operably connected to the engine output shaft via a second gear transmission mechanism.

5 Claims, 8 Drawing Sheets

(56) References Cited

U.S. PATENT DOCUMENTS

| | | | |
|---|---|---|---|
| 2001/0039908 A1* | 11/2001 | Bilek | F01N 13/004 114/55.5 |
| 2003/0188909 A1* | 10/2003 | Ohashi | B60K 25/00 180/300 |
| 2005/0197225 A1* | 9/2005 | Ishii | B60K 17/356 475/72 |
| 2006/0084548 A1* | 4/2006 | Abiru | B60K 17/08 475/200 |
| 2012/0055729 A1 | 3/2012 | Bessho et al. | |
| 2015/0068824 A1 | 3/2015 | Matsuura et al. | |

* cited by examiner

MULTIPURPOSE VEHICLE

CROSS-REFERENCE TO RELATED APPLICATION

This application claims priority to Japanese Patent Application No. 2019-229290 filed Dec. 19, 2019, the disclosure of which is hereby incorporated by reference in its entirety.

BACKGROUND OF THE INVENTION

1. Field of the Invention

The present invention relates to a multipurpose vehicle, which is also referred to as a utility vehicle in the field.

2. Description of Related Art

There is a multipurpose vehicle having an engine, a transmission casing which is provided behind the engine and outputs power to traveling wheels, and a stepless speed changer which is provided at one of lateral sides of a vehicle body with respect to the engine and a traveling transmission, and which receives power of the engine, speed-changes the power and outputs it to the transmission casing.

An example of such a multipurpose vehicle is shown in JP 2012-051506 A (or US 2012/0055729 A1 which is a counterpart thereof).

This multipurpose vehicle has an engine, a transmission casing as a traveling transmission which is provided behind the engine, and a belt-type stepless speed changer as a stepless speed changer which is provided at the right side, speed-changes power of the engine and outputs it to the transmission casing.

In addition to transporting a load, at a work site, the multipurpose vehicle is desired to use its engine as a power source for operating a snow blower, a loader, an electric generator and the like.

In view of the above, a multipurpose vehicle is desired in which power of an engine can be taken off efficiency with a simple arrangement.

SUMMARY OF THE INVENTION

An aspect of a multipurpose vehicle according to the present invention is as below:

A multipurpose vehicle comprising:
an engine;
a traveling transmission which is provided behind the engine and outputs power to traveling wheels;
a stepless speed changer which is provided at one of lateral sides of a vehicle body with respect to the engine and the traveling transmission, receives power of the engine, speed-changes the power and outputs it to the traveling transmission;
an engine output shaft projected from the engine toward the stepless speed changer along a lateral direction of the vehicle body;
a speed changer input shaft projected from the stepless speed changer toward the engine along the lateral direction of the vehicle body;
a first gear transmission mechanism provided between and across the engine output shaft and the speed changer input shaft for transmitting power of the engine output shaft to the speed changer input shaft; and
a power takeoff (PTO) section provided on a side of the stepless speed changer with respect to the engine and forwardly of the stepless speed changer, the PTO section being operably connected to the engine output shaft via a second gear transmission mechanism.

According to the features, power of an engine output shaft is transmitted to a speed changer input shaft with a first gear transmission mechanism, and a PTO section is provided which is operably connected with the engine output shaft via a second gear transmission mechanism, and thus the power of the engine output shaft can be transmitted to the PTO section with less transmission loss. Furthermore, by providing the PTO section forwardly of a stepless speed changer on the side of the stepless speed changer with respect to the engine, a transmission distance to be provided in the second gear transmission mechanism can be shortened and thus the power of the engine can be taken off efficiency with a simple PTO arrangement.

According to one preferred embodiment, the PTO section includes a rotary shaft having an output hole which is opened laterally outward with respect to the vehicle body.

With the above arrangement, the power can be taken off easily from the PTO section. For example, by only inserting an input shaft of a gear pump into the output hole from laterally outside of the vehicle body, the power can be taken off from the PTO section to the gear pump.

According to one preferred embodiment:
the first gear transmission mechanism has an engine output gear provided on the engine output shaft, and a first gear mechanism section transmitting power of the engine output gear to the speed changer input shaft, and
the second gear transmission mechanism has the engine output gear, and a second gear transmission mechanism transmitting power of the engine output gear to the PTO section.

Accordingly, the engine output gear transmits the power of the engine output shaft to the first gear transmission mechanism via the engine output gear, and the engine output gear also transmits the power of the engine output shaft to the second gear transmission mechanism. Consequently, the one engine output gear can input the power to both the first gear transmission mechanism and the second gear transmission mechanism, and thus the power of the engine output shaft can be transmitted to the PTO section and the stepless speed changer with a simple arrangement.

According to one preferred embodiment, a spacer housing is provided between the engine and the stepless speed changer to be detachable from the engine and the stepless speed changer, the first gear transmission mechanism and the second gear transmission mechanism being accommodated in the spacer housing.

Accordingly, only by providing the one spacer housing separately from the engine and the stepless speed changer, the first gear transmission mechanism and the second gear transmission mechanism can be accommodated inexpensively in the spacer housing.

According to one preferred embodiment, the spacer housing has an inner space in which a speed changer output shaft of the stepless speed changer is accommodated.

Accordingly, in addition to the first gear transmission mechanism and the second gear transmission mechanism, the speed changer output shaft can also be accommodated inexpensively in the one spacer housing.

DETAILED DESCRIPTION OF PREFERRED EMBODIMENTS

Figure 1:
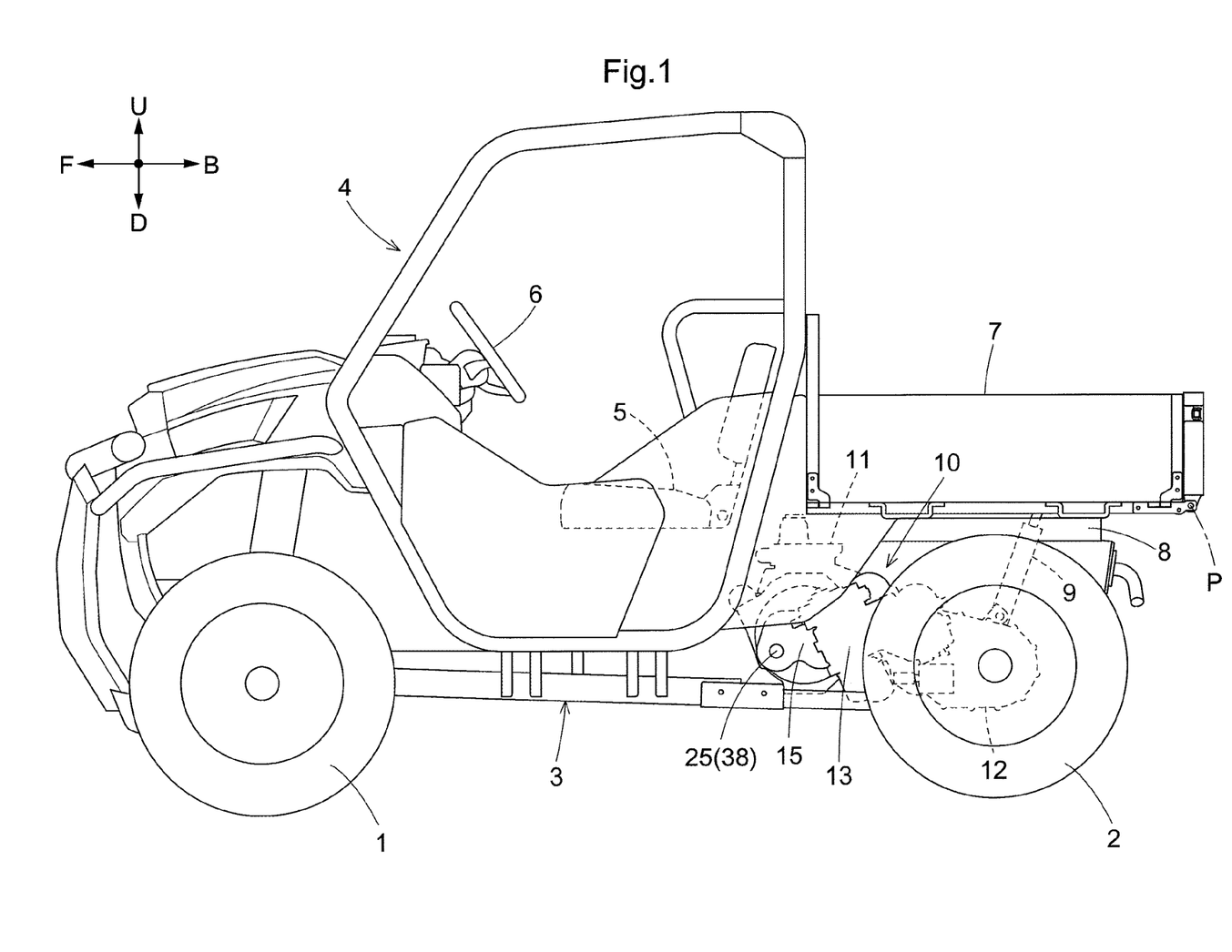
FIG. 1 is a left side view of an entire multipurpose vehicle according to one aspect of the invention.
Figure 2:
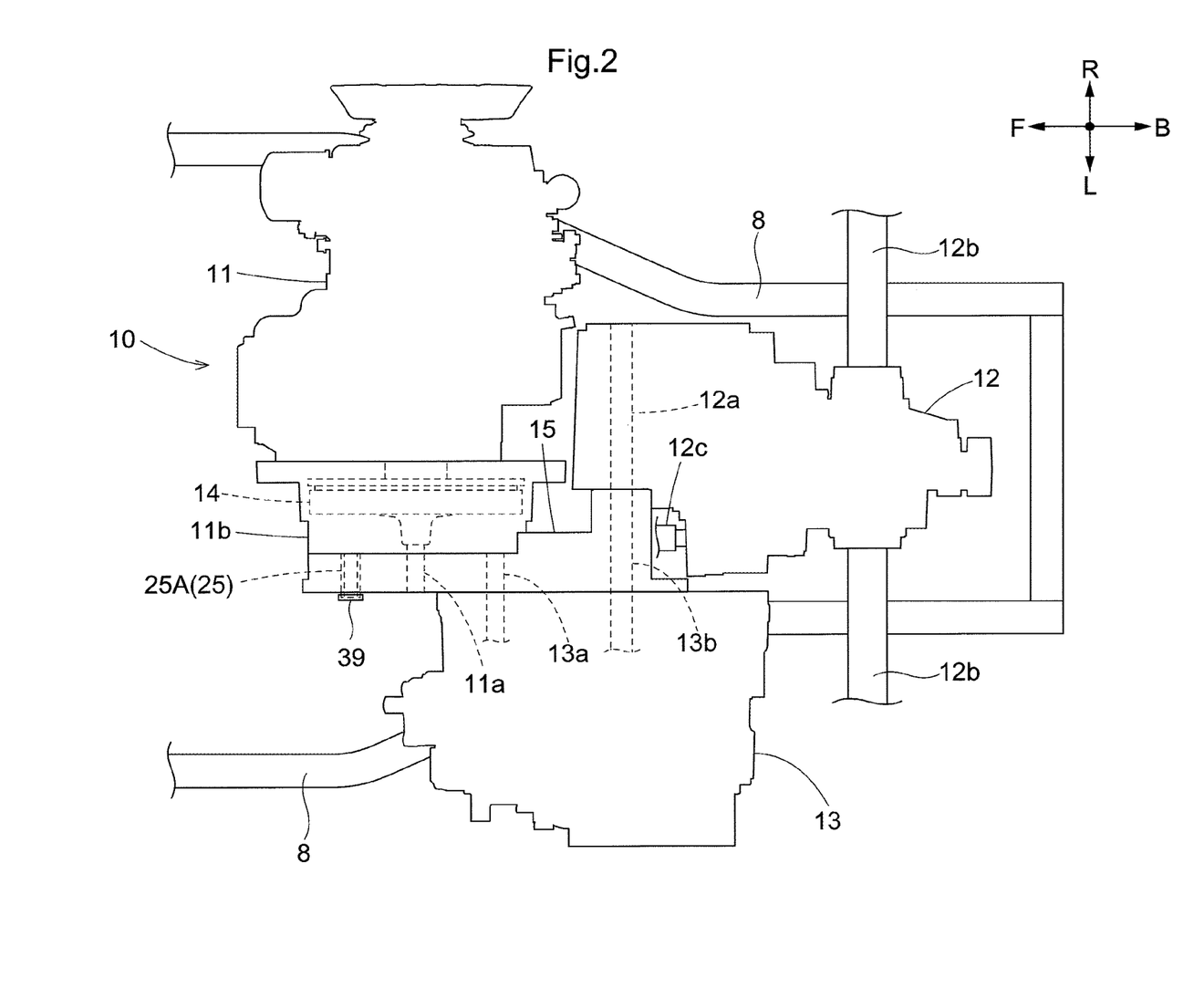
FIG. 2 is a plan view of an engine section.

In the following description, with respect to a traveling vehicle body of a multipurpose vehicle, a direction of an arrow "F" in FIGS. 1 and 2 is defined as a forward direction of the vehicle body; a direction of an arrow "B" in FIGS. 1 and 2 is defined as a rearward direction of the vehicle body; a direction of an arrow "U" in FIG. 1 is defined as an upward direction of the vehicle body; a direction of an arrow "D" in FIG. 1 is defined as a downward direction of the vehicle body; a direction of an arrow "L" in FIG. 2 is defined as a leftward direction of the vehicle body; and a direction of an arrow "R" in FIG. 2 is defined as a rightward direction of the vehicle body.

[General Configuration of Multipurpose Vehicle]

As shown in FIG. 1, the multipurpose vehicle has a traveling vehicle body 3 equipped with a pair of right and left front wheels 1 which can be steered and driven, and a pair of right and left rear wheels 2 which can be driven. A driving section 4 is formed at a longitudinal middle portion of the traveling vehicle body 3. The driving section 4 has a driver's seat 5 and a steering wheel 6 for steering the front wheels 1. A load carrying platform 7 is provided in a rear portion of the traveling vehicle body 3. Below the load carrying platform 7, an engine section 10 is formed which has an engine 11 outputting driving power to the front wheels 1 and the rear wheels 2. The engine section 10 has a PTO section 25 which takes off power of the engine 11.

[Configuration of Load Carrying Bed]

As shown in FIG. 1, the load carrying platform 7 is supported by a vehicle body frame 8 to be pivotal up and down about a dump axis P. The load carrying platform 7 is swung by telescopic operation of a hydraulic cylinder 9 connected to a lower side of the load carrying platform 7.

[Configuration of Engine Section]

Figure 3:
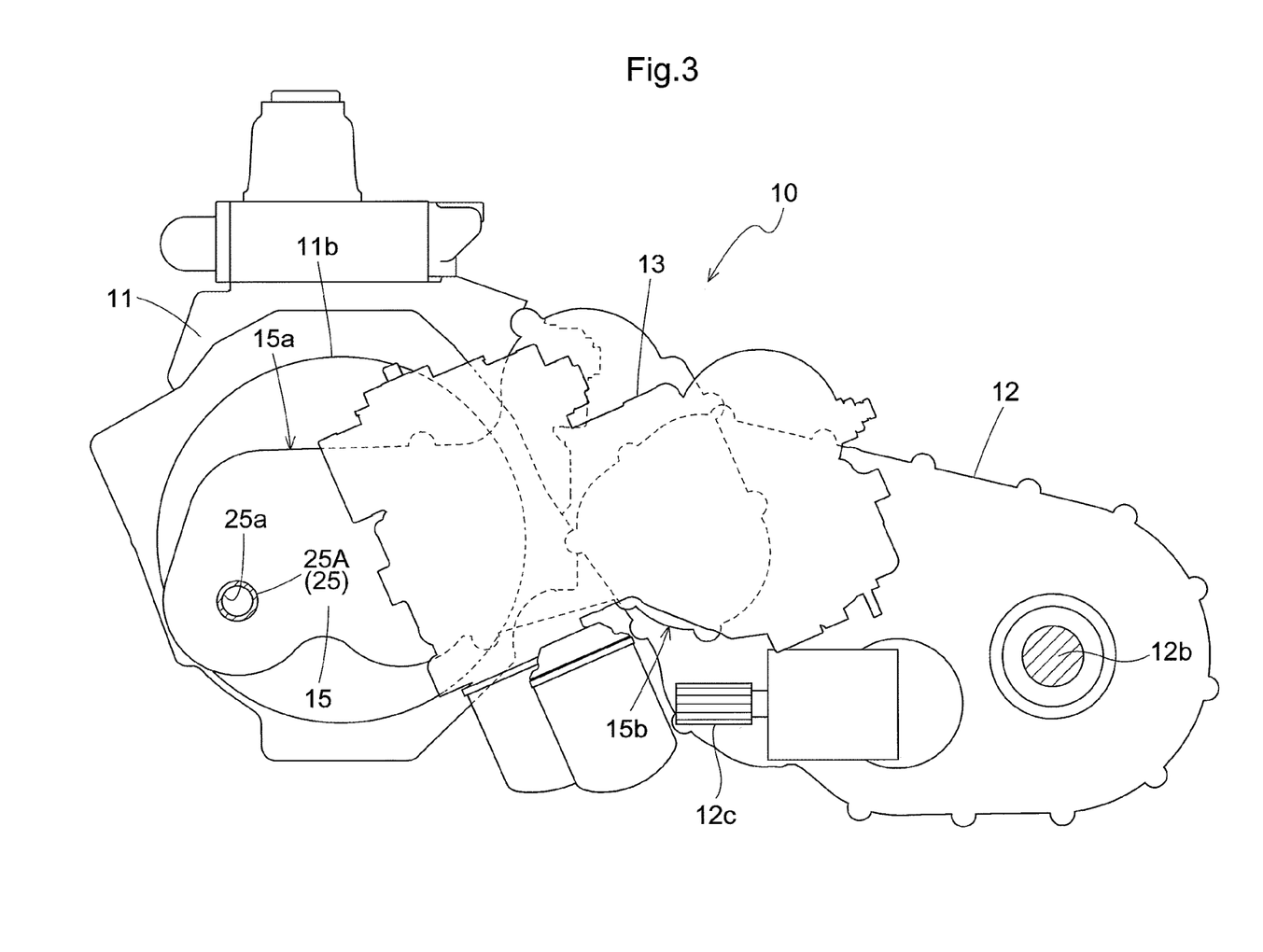
FIG. 3 is a left side view of the engine section.

As shown in FIGS. 1, 2 and 3, the engine section 10 has the engine 11 provided in a front portion of an area below the load carrying platform 7, a traveling transmission 12 provided behind the engine 11 with respect to the vehicle body, and a stepless speed changer 13 provided at the left side of the engine 11 and the traveling transmission 12 with respect to the vehicle body. In this embodiment, the stepless speed changer 13 is a hydrostatic stepless speed changer (hydrostatic transmission).

Figure 4:
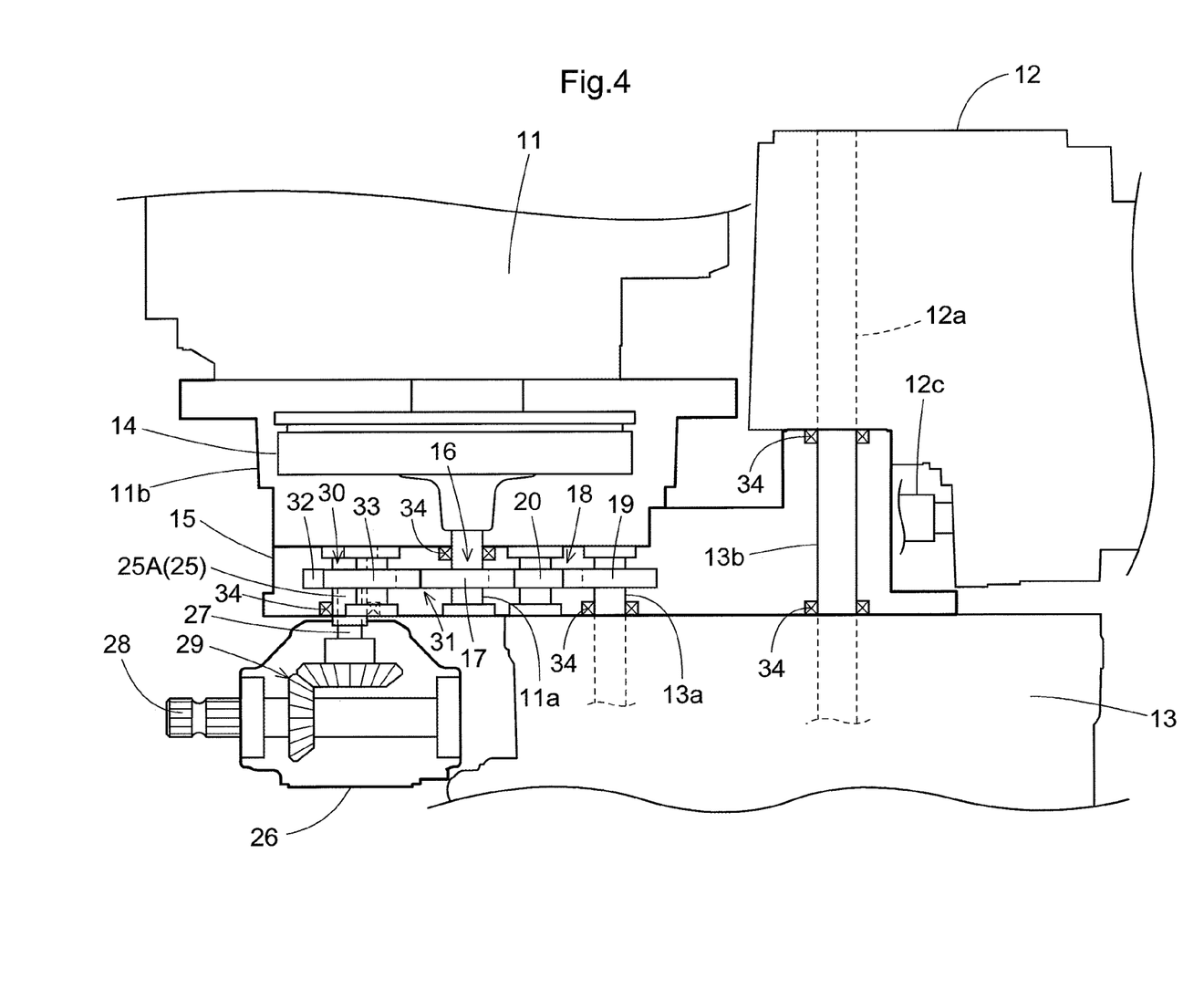
FIG. 4 is a view in section of a PTO section and a power transmission arrangement, showing an angle gearbox in its connected state.

The engine 11 is provided, with a crankshaft (not shown) being extended along a lateral width direction of the vehicle body. As shown in FIGS. 2 and 4, an engine output shaft 11a of the engine 11 is projected from a flywheel 14 of the engine 11 toward the stepless speed changer 13. The engine output shaft 11a is accommodated in a spacer housing 15 whose front portion is arranged between the engine 11 and the stepless speed changer 13, and whose rear portion is arranged between the stepless speed changer 13 and the traveling transmission 12. In this embodiment, the engine 11 is a diesel engine but is not limited thereto and may alternatively a gasoline engine.

As shown in FIGS. 2 and 4, a speed changer input shaft 13a of the stepless speed changer 13 is projected from a lateral side of the stepless speed changer 13 facing the engine toward the engine. The speed changer input shaft 13a is accommodated in the spacer housing 15. The speed changer input shaft 13a is operably connected to the engine output shaft 11a with a first gear transmission mechanism 16. The first gear transmission mechanism 16 is provided between and across the speed changer input shaft 13a and the engine output shaft 11a. The first gear transmission mechanism 16 is accommodated in a longitudinal middle portion of the spacer housing 15.

Figure 5:
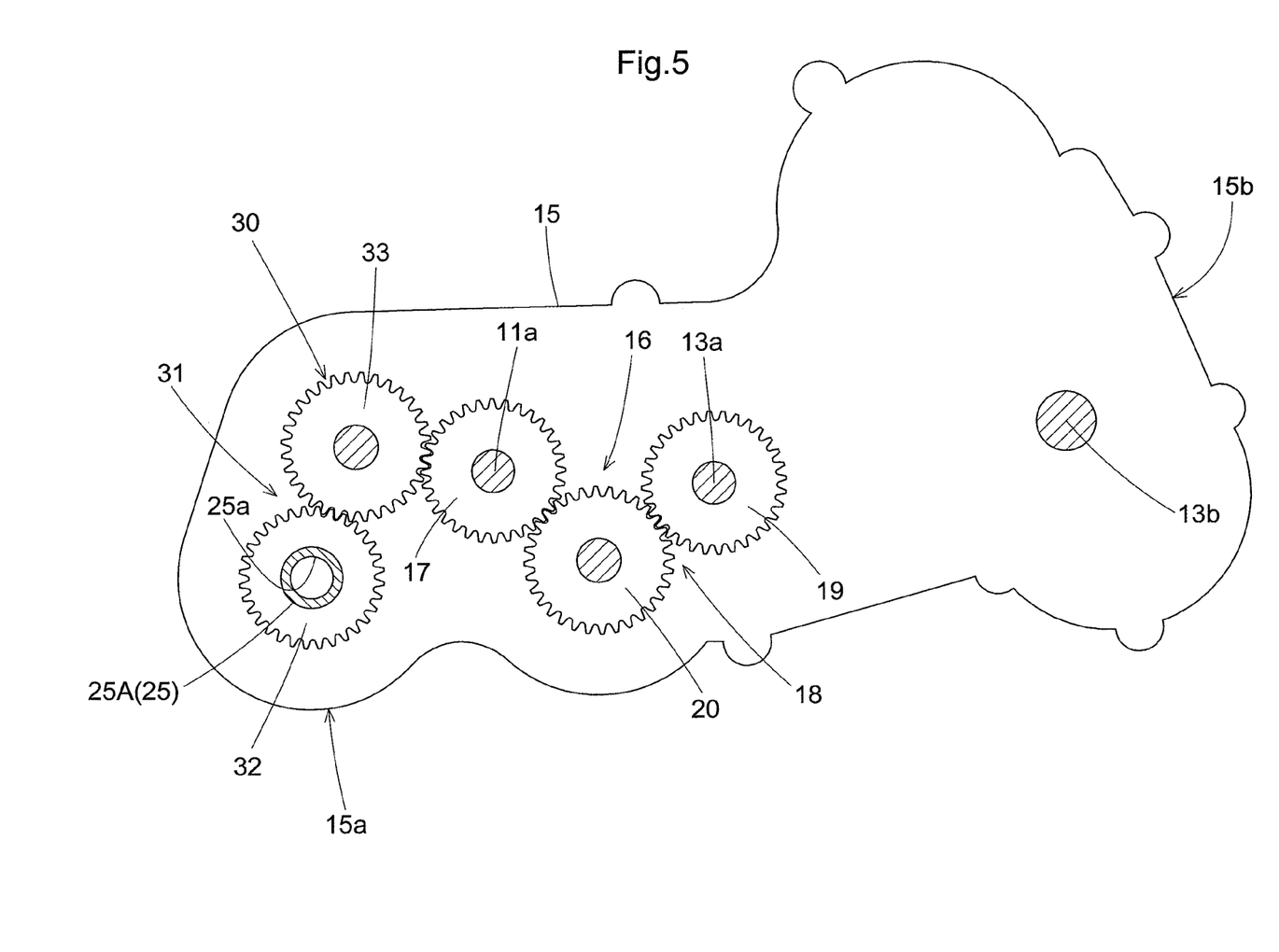
FIG. 5 is a side view of the PTO section and the power transmission arrangement.

Specifically, as shown in FIGS. 4 and 5, the first gear transmission mechanism 16 has an engine output gear 17 provided on the first gear transmission mechanism 16 and a first gear mechanism section 18 transmitting power of the engine output gear 17 to the speed changer input shaft 13a. The first gear mechanism section 18 has a speed change input gear 19 provided on the speed changer input shaft 13a and a first relay transmission gear 20 meshing with the speed change input gear 19 and the engine output gear 17. In this embodiment, the first gear mechanism section 18 has the speed change input gear 19 and the first relay transmission gear 20, but the number of the gears are not limited to two and three or more gears may alternatively be used.

As shown in FIGS. 2 and 4, a speed changer output shaft 13b of the stepless speed changer 13 is projected from a lateral side of the stepless speed changer 13 facing the traveling transmission toward the traveling transmission. The speed changer output shaft 13b is arranged in an inner space of a rear portion 15b of the spacer housing 15 and accommodated in the spacer housing 15. The speed changer output shaft 13b is operably connected to a speed changer input shaft 12a of the traveling transmission 12, with the speed changer output shaft 13b being arranged coaxially to the speed changer input shaft 12a.

In the engine section 10, the power of the engine output shaft 11a of the engine 11 is inputted to the first gear transmission mechanism 16 via the engine output gear 17, transmitted to the speed changer input shaft 13a and inputted to the stepless speed changer 13 via the first gear transmission mechanism 16, and converted into forward driving power and reverse driving power with the stepless speed changer 13 while the rotational speed of the forward driving power and the reverse driving power is speed-changed steplessly. The speed-changed forward driving power and reverse driving power are transmitted from the speed changer output shaft 13b to the speed changer input shaft 12a and inputted to the traveling transmission 12. The inputted forward driving power and reverse driving power are outputted to the rear wheels 2 from rear wheel output sections 12b (see FIG. 2) formed at lateral sides of a rear portion of the traveling transmission 12. The forward driving power and the reverse driving power inputted to the traveling transmission 12 are outputted to the front wheels 1 from a front wheel output shaft 12c (see FIG. 3) provided at a lateral side of a lower portion of the traveling transmission 12,

[Configuration of PTO Section]

As shown in FIGS. 2 and 3, the PTO section 25 is provided forwardly of the stepless speed changer 13 and at the side of the stepless speed changer with respect to the engine 11. The PTO section 25 includes a rotary shaft (referred to as rotary shaft 25A hereinafter) rotatably supported in a front portion 15a of the spacer housing 15. The rotary shaft 25A is arranged parallel to the engine output shaft 11a. The rotary shaft 25A has an output hole 25a opened laterally with respect to the vehicle body. The output hole 25a is opened to the outside of the spacer housing 15 via a through hole formed in a side wall of the spacer housing 15. The output hole 25a comprises a spline hole. The rotary shaft 25A is operably connected to the engine output shaft 11a via a second gear transmission mechanism 30 provided between and across the rotary shaft 25A and the engine output shaft 11a. The second gear transmission mechanism 30 is accommodated in the spacer housing 15.

Specifically, as shown in FIGS. 4 and 5, the second gear transmission mechanism 30 has the engine output gear 17 and a second gear mechanism section 31 transmitting power of the engine output gear 17 to the rotary shaft 25A. The second gear mechanism section 31 has a rotary shaft gear 32 provided on the rotary shaft 25A, and a second relay transmission gear 33 meshing with the rotary shaft gear 32 and the engine output gear 17.

In this embodiment, the second gear mechanism section 31 has the rotary shaft gear 32 and the second relay transmission gear 33, but gears are not limited thereto and three or more gears may alternatively be used.

Figure 6:
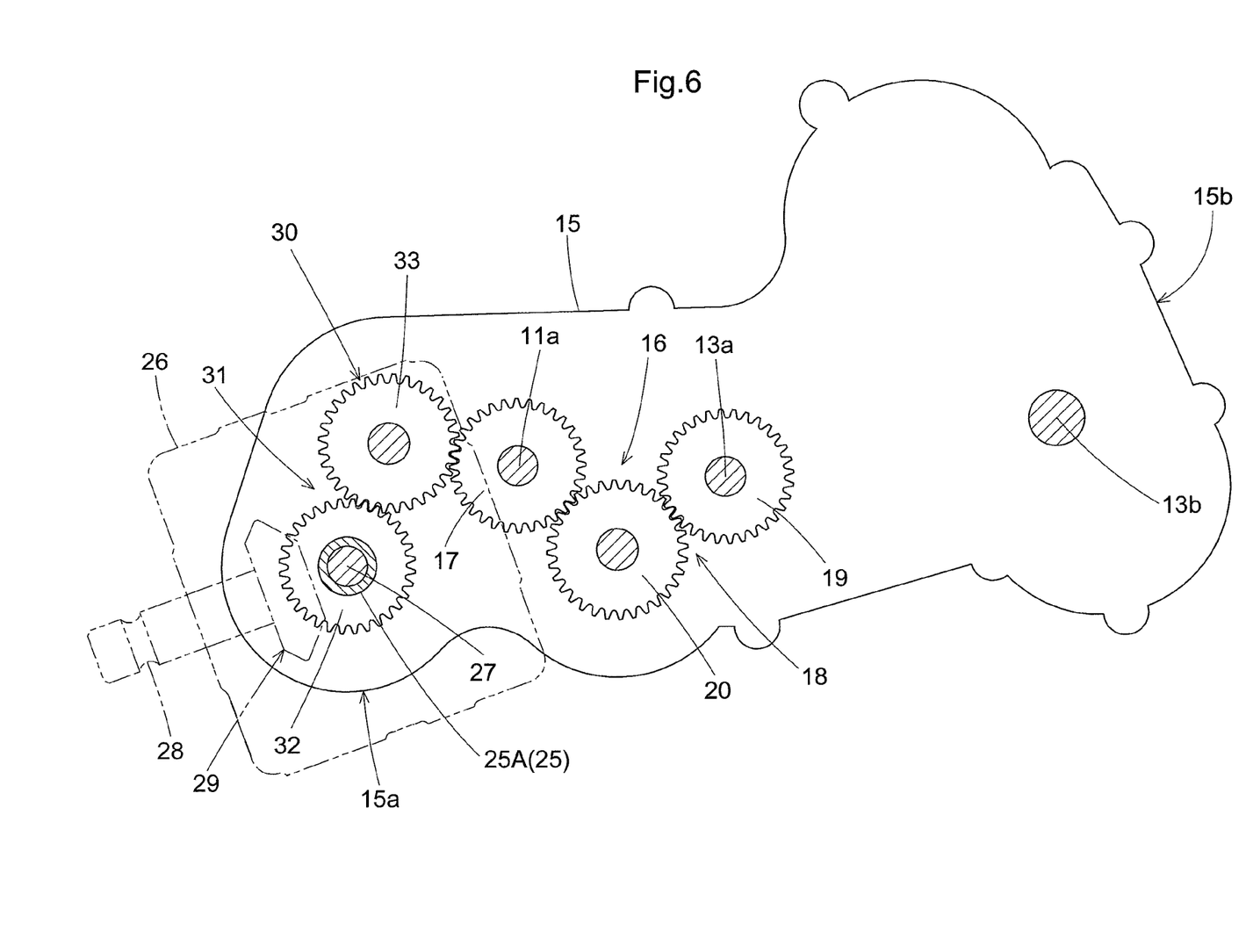
FIG. 6 is a side view showing a connection mode of the angle gearbox.

Referring to the rotary shaft 25A, as shown in FIGS. 4 and 6 for example, an input shaft 27 of an angle gearbox 26 is connected to the rotary shaft 25A so that the power taken off with the rotary shaft 25A can be taken off with an output shaft 28 of the angle gearbox 26.

Figure 7:
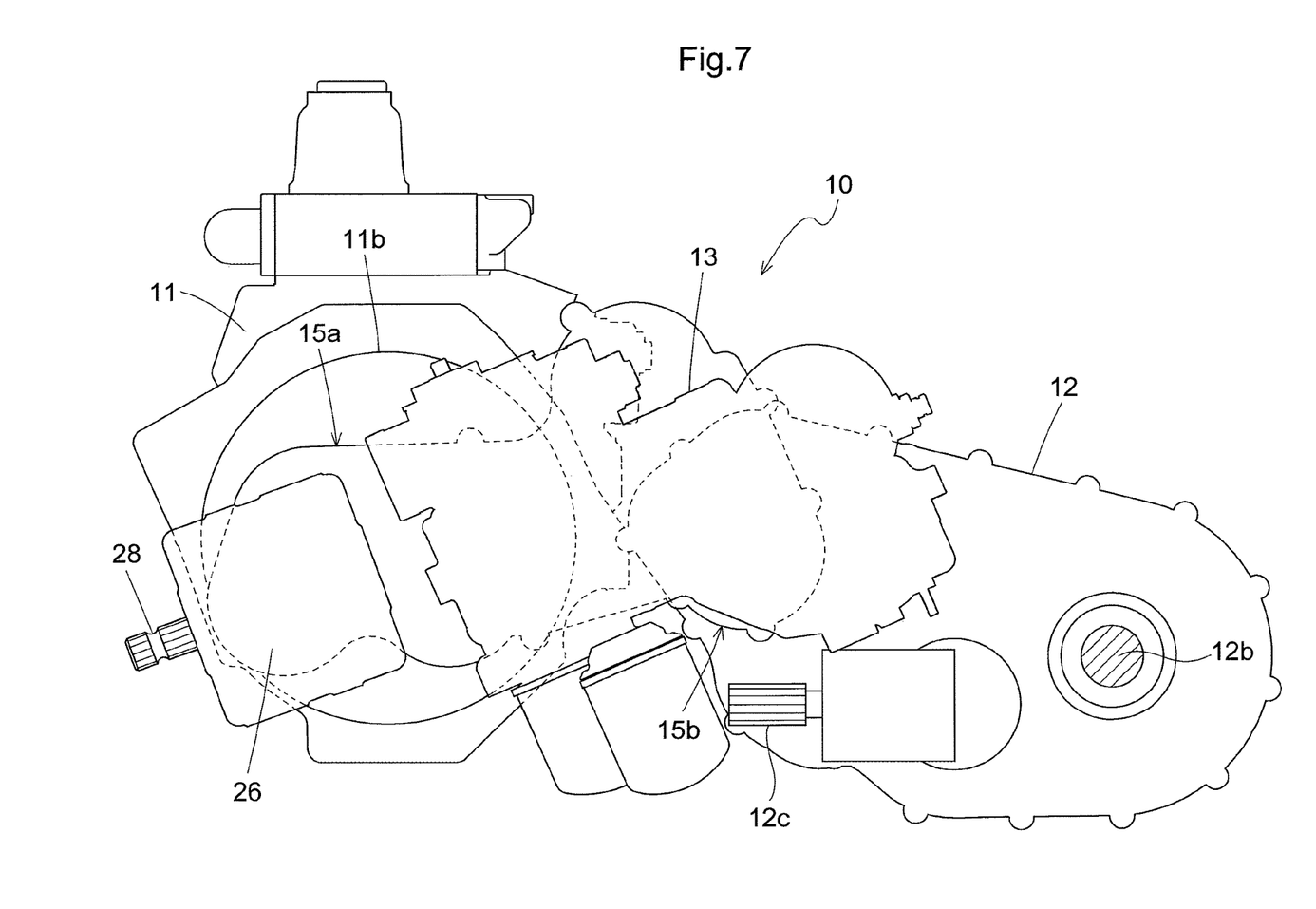
FIG. 7 is a left side view of the engine section, showing the angle gearbox connected thereto.

In this case, as shown in FIGS. 4 and 7, the angle gearbox 26 is arranged forwardly of the stepless speed changer 13. Specifically, the angle gearbox 26 has the input shaft 27 projected from the angle gearbox 26 inward along the lateral width direction of the vehicle body, and the output shaft 28 projected from the angle gearbox 26 forward with respect to the vehicle body. The input shaft 27 comprises a spline shaft and is inserted into the output hole 25a of the rotary shaft 25A so as to be engaged with the rotary shaft 25A unrotatably relative thereto. The input shaft 27 is operably connected to the output shaft 28 with a gear interlocking mechanism 29 accommodated in the angle gearbox 26.

Figure 8:
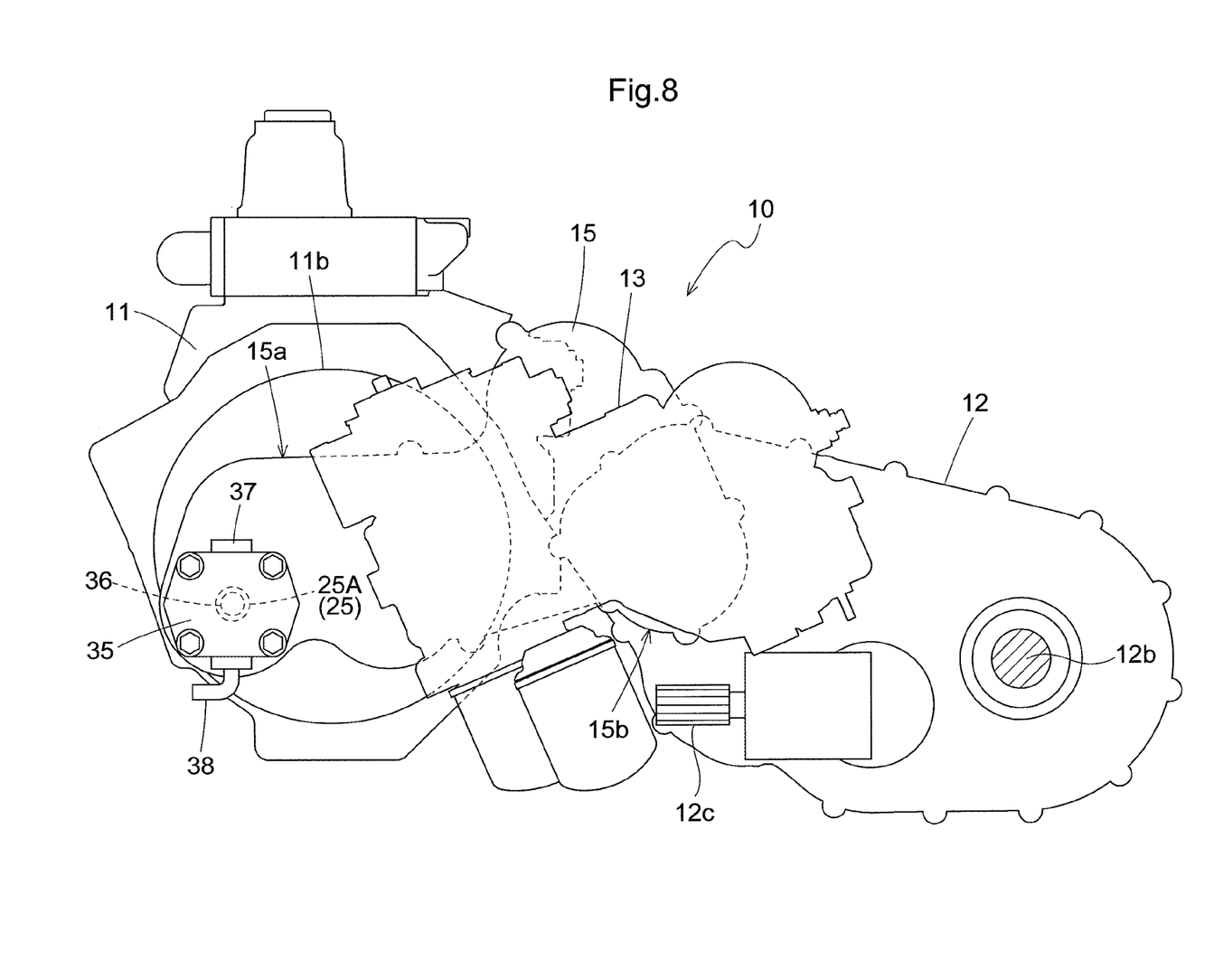
FIG. 8 is a left side view of the engine section, showing a gear pump connected thereto.

Referring to the rotary shaft 25A, as shown in FIG. 8 for example, the rotary shaft 25A is connected to a spline shaft-shaped input shaft 36 of a gear pump 35 so that the gear pump 35 is driven by the power of the engine taken off with the rotary shaft 25A. The gear pump 35, when used as a hydraulic pump, is used as a power source for driving and lifting a snow removing auger and lifting a snow removing blade and a loader. The gear pump 35, when used as a water pump, can pump water from a water source such as a pond and a river. The gear pump 35 has an inlet port 37 connected to a suction hose and a discharge port 38 connected to a drain hose.

When the rotary shaft 25A is not used, as shown in FIG. 2, the output hole 25a can be closed with a plug 39 which can be attached to the output hole 25a.

[Configuration of Spacer Housing]

The spacer housing 15 is formed separately from the engine 11, the stepless speed changer 13 and the traveling transmission 12, and detachably attached to a flywheel housing section 11b of the engine 11, a side wall of the stepless speed changer 13 adjacent the engine, and a side wall of the traveling transmission 12 adjacent the stepless speed changer.

Referring to the spacer housing 15, as shown in FIG. 4, an oil seal 34 closing a gap between the rotary shaft 25A and a wall part of the spacer housing 15 is provided on an outer peripheral part of a through hole into which the rotary shaft 25A is inserted. Further oil seal 34 closing a gap between the engine output shaft 11a and a wall part of the spacer housing 15 is provided on an outer circumferential part of a through hole into which the engine output shaft 11a is inserted. Further oil seal 34 closing a gap between the speed changer input shaft 13a and a wall part of the spacer housing 15 is provided on an outer peripheral part of a through hole into which the speed changer input shaft 13a is inserted. Further oil seal 34 closing a gap between the speed changer output shaft 13b and a wall part of the spacer housing 15 is provided on an outer peripheral part of a through hole into which the speed changer output shaft 13b is inserted. Lubricating oil is stored in an inner space of the spacer housing 15.

Other Embodiments (1) In the above embodiment, the rotary shaft having the output hole 25a is used as the PTO section 25, but the PTO section is not limited thereto. For example, a spline shaft-shaped rotary shaft or a gear may alternatively be used.

(2) In the above embodiment, the stepless speed changer 13 is provided at the left side of the vehicle body with respect to the engine 11 and the traveling transmission 12, but may alternatively be provided at the right side of the vehicle body with respect to the engine 11 and the traveling transmission 12.

(3) In the above embodiment, the stepless speed changer 13 comprises a hydrostatic stepless speed changer, but may alternatively comprise a belt-type stepless speed changer.

(4) In the above embodiment, the engine output gear 17 for taking off the power from the first gear transmission mechanism 16 and the second gear transmission mechanism 30 transmits the power of the engine output shaft 11a to the first gear transmission mechanism 16 and the second gear transmission mechanism 30. However, the present invention is not limited thereto, and it may alternatively be configured as follows: two engine output gears are provided on the engine output shaft 11a so that one of the two engine output gears transmits the power of the engine output shaft to the first gear transmission mechanism 16 and the other of the two engine output gears transmits the power of the engine output shaft 11a to the second gear transmission mechanism 30.

(5) In the above embodiment, each of the first gear transmission mechanism 16 and the second gear transmission mechanism 30 has the three gears, but the number of gears is not limited thereto and may alternatively be two, four or more.

(6) In the above embodiment, the speed changer output shaft 13b is connected directly to the speed changer input shaft 12a, but these shafts may alternatively be operably connected to each other via a gear transmission mechanism.

(7) In the above embodiment, the power of the traveling transmission 12 is outputted to the front wheels 1 and the rear wheels 2, but may alternatively be outputted to only one of the front wheels 1 and the rear wheels 2.

What is claimed is:

1. A multipurpose vehicle comprising:
an engine;
a traveling transmission which is provided behind the engine and outputs power to traveling wheels;
a stepless speed changer which is provided at one of lateral sides of a vehicle body with respect to the engine and the traveling transmission, receives power of the engine, speed-changes the power and outputs it to the traveling transmission;

an engine output shaft projected from the engine toward the stepless speed changer along a lateral direction of the vehicle body;

a speed changer input shaft projected from the stepless speed changer toward the engine along the lateral direction of the vehicle body;

a first gear transmission mechanism provided between the engine output shaft and the speed changer input shaft for transmitting power of the engine output shaft to the speed changer input shaft such that the speed changer input shaft is operably connected to the engine output shaft with the first gear transmission mechanism; and a power takeoff (PTO) section provided on a side of the stepless speed changer with respect to the engine and forwardly of the stepless speed changer, the PTO section being operably connected to the engine output shaft via a second gear transmission mechanism.

2. The multipurpose vehicle according to claim 1, wherein the PTO section includes a rotary shaft having an output hole which is opened laterally outward with respect to the vehicle body.

3. The multipurpose vehicle according to claim 1, wherein the first gear transmission mechanism has an engine output gear provided on the engine output shaft, and a first gear mechanism section transmitting power of the engine output gear to the speed changer input shaft, and wherein the second gear transmission mechanism has the engine output gear, and a second gear transmission mechanism transmitting power of the engine output gear to the PTO section.

4. The multipurpose vehicle according to claim 1, wherein a spacer housing is provided between the engine and the stepless speed changer to be detachable from the engine and the stepless speed changer, the first gear transmission mechanism and the second gear transmission mechanism being accommodated in the spacer housing.

5. The multipurpose vehicle according to claim 4, wherein the spacer housing has an inner space in which a speed changer output shaft of the stepless speed changer is accommodated.

* * * * *